US012185329B2

(12) United States Patent
Wu

(10) Patent No.: US 12,185,329 B2
(45) Date of Patent: Dec. 31, 2024

(54) WIRELESS COMMUNICATION METHOD, NETWORK DEVICE AND TERMINAL DEVICE

(71) Applicant: GUANGDONG OPPO MOBILE TELECOMMUNICATIONS CORP., LTD., Dongguan (CN)

(72) Inventor: Zuomin Wu, Dongguan (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 332 days.

(21) Appl. No.: 17/565,707

(22) Filed: Dec. 30, 2021

(65) Prior Publication Data
US 2022/0132478 A1 Apr. 28, 2022

Related U.S. Application Data

(63) Continuation of application No. PCT/CN2019/094284, filed on Jul. 1, 2019.

(51) Int. Cl.
*H04W 72/23* (2023.01)
*H04W 16/14* (2009.01)
*H04W 72/0446* (2023.01)

(52) U.S. Cl.
CPC ........... *H04W 72/23* (2023.01); *H04W 16/14* (2013.01); *H04W 72/0446* (2013.01)

(58) Field of Classification Search
CPC .............................. H04W 72/23; H04W 16/14
USPC .......................................................... 370/329
See application file for complete search history.

(56) References Cited

U.S. PATENT DOCUMENTS

| 2012/0170497 | A1 | 7/2012 | Zhang |
| 2013/0114529 | A1 | 5/2013 | Chen et al. |
| 2016/0337975 | A1 | 11/2016 | Li et al. |
| 2020/0229231 | A1 | 7/2020 | Oh et al. |

FOREIGN PATENT DOCUMENTS

| CN | 108513362 A | 9/2018 |
| CN | 108632960 A | 10/2018 |
| CN | 109392104 A | 2/2019 |
| CN | 109565834 A | 4/2019 |
| CN | 109644358 A | 4/2019 |
| KR | 20150128234 A | 11/2015 |
| WO | 2014035074 A1 | 3/2014 |
| WO | 2019013606 A1 | 1/2019 |

(Continued)

OTHER PUBLICATIONS

International Search Report and the Written Opinion Dated Mar. 26, 2020 From the International Searching Authority Re. Application No. PCTCN2019094284, 11 pages.

(Continued)

*Primary Examiner* — Angel T Brockman
(74) *Attorney, Agent, or Firm* — BAYES PLLC

(57) ABSTRACT

Provided are a wireless communication method and device for an unlicensed spectrum, wherein same can realize physical downlink control channel (PDCCH) monitoring on the unlicensed spectrum. The method includes: a terminal device monitoring a target downlink signal; and when the target downlink signal is detected at a first time-point, the terminal device monitoring a PDCCH from a second time-point, wherein the second time-point is later than the first time-point.

5 Claims, 6 Drawing Sheets

(56) References Cited

FOREIGN PATENT DOCUMENTS

| WO | 2019051707 A1 | 3/2019 |
| WO | 2019122518 A1 | 6/2019 |

OTHER PUBLICATIONS

The supplementary European search report dated Sep. 13, 2022 from European patent Application No. 19936359.9.
The partial supplementary European Search Report Dated May 25, 2022 from European Application No. 19936359.9.
OPPO: "Frame structure for NR-U", R1-1812798, 3GPP TSG RAN WG1 Meeting #95, Spokane, USA, Nov. 12-16, 2018.
The First Office Action dated May 24, 2024 from Chinese patent application No. 202211634190.3.

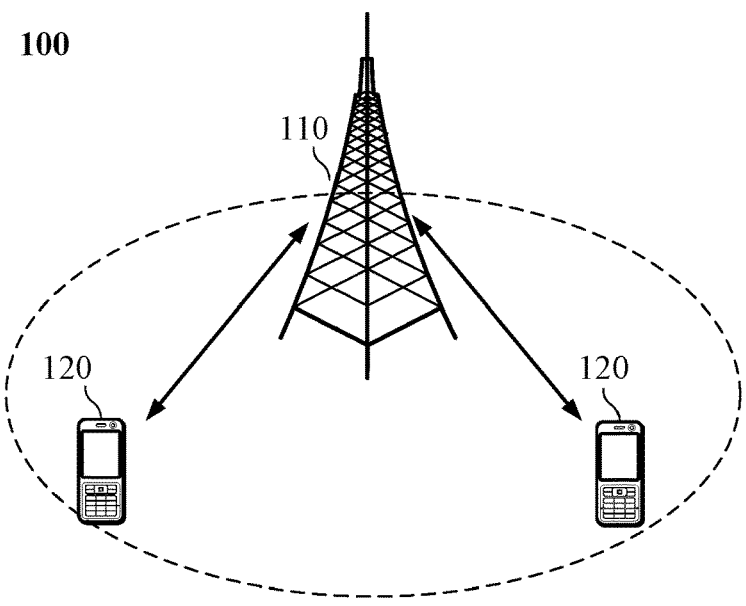
FIG. 1
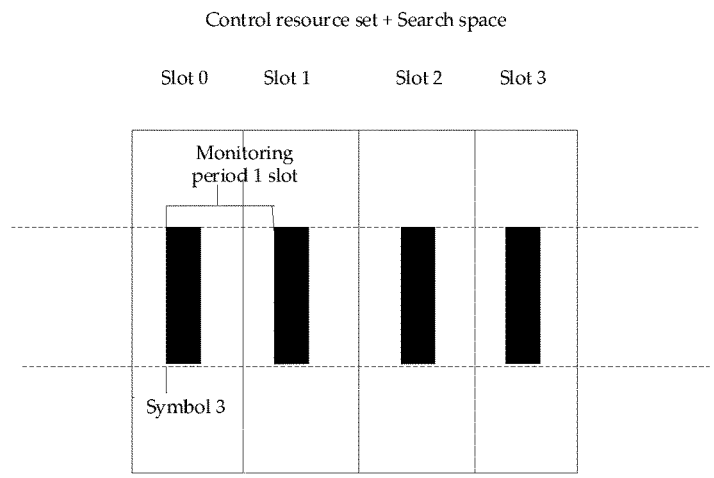
FIG. 2
FIG. 3

WIRELESS COMMUNICATION METHOD, NETWORK DEVICE AND TERMINAL DEVICE

CROSS REFERENCE TO RELATED APPLICATIONS

This application is a continuation of International Application No. PCT/CN2019/094284, filed on Jul. 1, 2019, the contents of which are incorporated herein by reference in its entirety.

BACKGROUND

The embodiments of the present application relate to communication technologies, and more particularly to a wireless communication method, network device and terminal device.

In a wireless communication system, a base station can schedule physical downlink shared channel (PDSCH) to a terminal device by physical downlink control channel (PDCCH).

For unlicensed spectrum, the base station needs to perform a Listen Before Talk (LBT) operation before sending the PDCCH, and sends the PDCCH only when the LBT operation is successful. How the terminal device realizes PDCCH monitoring on the unlicensed spectrum is a problem to be solved urgently.

SUMMARY

Provided are a wireless communication method and device for an unlicensed spectrum, wherein same can realize PDCCH monitoring on the unlicensed spectrum.

In a first aspect, provided is a wireless communication method for unlicensed spectrum, comprising: monitoring, by a terminal device, a target downlink signal; monitoring, by the terminal device when the target downlink signal is detected at a first time-point, physical downlink control channel (PDCCH) from a second time-point, wherein the second time-point is later than the first time-point.

In a second aspect, provided is a wireless communication method for unlicensed spectrum, comprising: sending, by a network device, first configuration information to a terminal device, the first configuration information configured for the terminal device to determine a first monitoring behavior and a second monitoring behavior, wherein the first monitoring behavior is different from the second monitoring behavior; the second monitoring behavior is a behavior of monitoring, when a target downlink signal is detected at a first time-point, PDCCH from a second time-point; the first monitoring behavior is a behavior of monitoring PDCCH between the first time-point and the second time-point, or the first monitoring behavior is a behavior of monitoring the target downlink signal before the first time-point in a situation that the target downlink signal is PDCCH.

In a third aspect, a terminal device is provided for executing the method according to the first aspect.

Specifically, the terminal device includes functional modules configured to execute the method in the first aspect.

In a fourth aspect, a network device is provided for executing the method according to the second aspect.

Specifically, the network device includes functional modules configured to execute the method in the second aspect.

In a fifth aspect, a communication device is provided, which includes a processor and a memory. The memory is configured to store a computer program, and the processor is configured to call and run the computer program stored in the memory to implement the method of the first aspect or the second aspect.

In a sixth aspect, a chip is provided, which is configured to implement the method of the first aspect or the second aspect.

Specifically, the chip includes a processor configured to call and run a computer program from a memory to enable a device with the chip installed to execute the method of the first aspect or the second aspect.

In a seventh aspect, a computer readable storage medium is provided for storing a computer program, which enables a computer to execute the method of the first aspect or the second aspect.

In an eighth aspect, a computer program product is provided, which includes computer program instructions enabling a computer to execute the method of the first aspect or the second aspect.

In a ninth aspect, a computer program is provided, when running on a computer, enabling the computer to execute the method of the first aspect or the second aspect.

By above technical solutions, the terminal device monitors the target downlink signal; when the target downlink signal is detected at the first time-point, it indicates that the unlicensed spectrum has been occupied by the network device. Then, the terminal device monitors the PDCCH from the second time-point, and this may allow the terminal device to implement PDCCH monitoring on the unlicensed spectrum. Moreover, when the target downlink signal is detected at the first time-point, the terminal device monitors the PDCCH from the second time-point. The terminal device does not have to monitor the PDCCH all the way. It can make the terminal device save power.

BRIEF DESCRIPTION OF THE DRAWINGS

FIG. 1 is a schematic diagram illustrating a communication system framework provided in an embodiment of the present application.

FIG. 2 is a schematic diagram illustrating resources for monitoring PDCCH provided in an embodiment of the present application.

FIG. 3 is a schematic diagram illustrating PDCCH candidates according to an embodiment of the present application.

DETAILED DESCRIPTION

Figure 4:
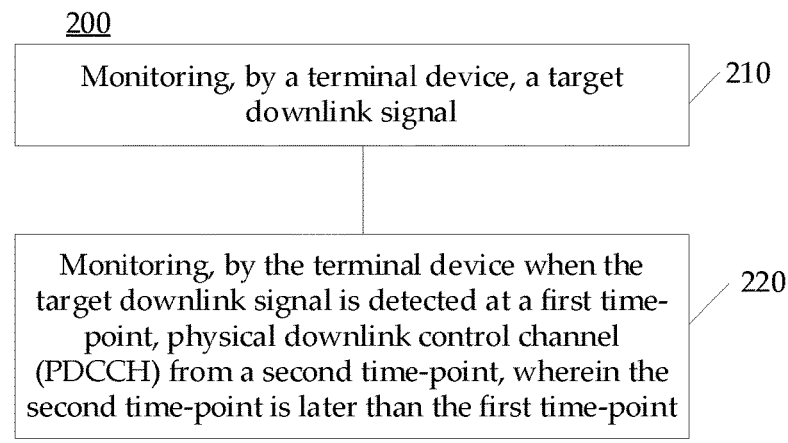
FIG. 4 is a schematic flowchart of a wireless communication method for unlicensed spectrum according to an embodiment of the present application.

The technical solutions in the embodiments of the present application are described below with reference to appending drawings of the embodiments of the present application. Obviously, the described embodiments are a part of embodiments of the present application but are not all of the embodiments. Based on the embodiments of the present application, all the other embodiments obtained by those of ordinary skill in the art without making any inventive effort are within the scope sought to be protected in the present application.

The solutions of the embodiments of the present application may be applied to various communication systems, such as, a Global System of Mobile Communication (GSM) system, a Code Division Multiple Access (CDMA) system, a Wideband Code Division Multiple Access (WCDMA) system, a General Packet Radio Service (GPRS), a Long Term Evolution (LTE) system, an LTE Frequency Division Duplex (FDD) system, an LTE Time Division Duplex (TDD) system, an Advanced long term evolution (LTE-A) system, a New Radio (NR) system, an evolution system of a NR system, an LTE-based access to unlicensed spectrum (LTE-U) system, a NR-based access to unlicensed spectrum (NR-U) system, a universal mobile telecommunications system (UMTS), a Worldwide Interoperability for Microwave Access (WiMAX) communication system, Wireless Local Area Network (WLAN), Wireless Fidelity (WiFi) and a next generation communication system or other communication systems, etc.

In general, traditional communication systems support a limited number of connection and are easy to implement. However, with development of communication technologies, mobile communication systems will not only support traditional communication, but also support, for example, Device to Device (D2D) communication, Machine to Machine (M2M) communication, Machine Type Communication (MTC), Vehicle to Vehicle (V2V) communication, etc., and the embodiments of the present application may also be applied to these communication systems.

Exemplarily, a communication system 100 applied according to an embodiment of the present application is illustrated in FIG. 1. The communication system 100 may include a network device 110, and the network device 110 may be a device communicating with a terminal device 120 (or called a communication terminal or a terminal). The network device 110 may provide communication coverage for a specific geographical region and may communicate with a terminal device under the coverage. Optionally, the network device 110 may be a Base Transceiver Station (BTS) in the GSM or the CDMA system, may also be a NodeB (NB) in the WCDMA system, and may further be an Evolutional Node B (eNB or eNodeB) in the LTE system or a wireless controller in a Cloud Radio Access Network (CRAN). Alternatively, the network device may be a mobile switching center, a relay station, an access point, a vehicle device, a wearable device, a hub, a switch, a network bridge, a router, a network-side device in a 5G network, a network device in a future evolved Public Land Mobile Network (PLMN) or the like.

The communication system 100 further includes at least one terminal device 120 located within the coverage area of the network device 110. A "terminal device" used herein includes, but not limited to, a device connected through a wired line connection, for example, through Public Switched Telephone Network (PSTN), Digital Subscriber Line (DSL), digital cable or direct cable; and/or a device connected with another data link/network; and/or a device connected through a wireless interface, for example, a cellular network, a Wireless Local Area Network (WLAN), a digital television network like a Digital Video Broadcasting-Handheld (DVB-H) network, a satellite network and an Amplitude Modulated (AM)-Frequency Modulated (FM) broadcast transmitter; and/or a device configured by another terminal device to receive/send a communication signal; and/or an Internet of Things (IoT) device. A terminal device configured to communicate by a wireless interface may be called a "wireless communication terminal", a "wireless terminal" or a "mobile terminal". Examples of a mobile terminal include, but not limited to, a satellite or cellular telephone, a Personal Communication System (PCS) terminal capable of combining capabilities of a cellular radio telephone and data processing, faxing and data communication, a Personal Digital Assistant (PDA) capable of including a radio telephone, a pager, Internet/Intranet access, a Web browser, a notepad, a calendar and/or a Global Positioning System (GPS) receiver, and a conventional laptop and/or palmtop receiver or another electronic device including a radio telephone transceiver. The terminal device may refer to an access terminal, a user equipment (UE), a user unit, a user station, a mobile station, a mobile radio station, a remote station, a remote terminal, a mobile device, a user terminal, a terminal, a wireless communication device, a user agent or a user device. The access terminal may be a cell phone, a cordless phone, a Session Initiation Protocol (SIP) phone, a Wireless Local Loop (WLL) station, a PDA, a handheld device with a wireless communication function, a computing device, another processing device connected to a wireless modem, a vehicle device, a wearable device, a terminal device in the 5G network, a terminal device in the future evolved PLMN or the like.

Optionally, device to device (D2D) communication may be performed between terminal devices 120.

Optionally, the 5G system or the 5G network may also be called an NR system or an NR network.

FIG. 1 exemplarily shows one network device and two terminal devices. Optionally, the communication system 100 may include a plurality of network devices and may include other numbers of terminal devices under the coverage of each network device. There is no limit made thereto in the embodiments of the application.

Optionally, the communication system 100 may further include other network entities such as a network controller and a mobility management entity (MME). There is no limit made thereto in the embodiments of the application.

It is to be understood that a device with a communication function in the network/system in the embodiments of the application may be called a communication device. For example, for the communication system 100 illustrated in FIG. 1, communication devices may include the network device 110 and terminal device 120 with the communication function, and the network device 110 and the terminal device 120 may be the specific devices mentioned above and will not be elaborated herein. The communication devices may further include other devices in the communication system 100, for example, other network entities like a network controller and a mobility management entity. There is no limit made thereto in the embodiments of the application.

It is to be understood that the terms "system" and "network" in this article may usually be exchanged in the application. In the application, the term "and/or" is only a kind of association for describing related objects and, which means that there can be three kinds of relationships, for example, A and/or B may represent three conditions, i.e., independent existence of A, existence of both A and B and independent existence of B. In addition, the character "/" in this article generally represents that previous and next associated objects form an "or" relationship.

The method in the embodiments of the present application may be applied to communications over an unlicensed spectrum. An unlicensed spectrum is a spectrum that may be used for communication of radio devices and that is allocated by a nation or a region. The spectrum may be considered as a shared spectrum. That is to say, as long as communications devices in different communications systems satisfy a regulatory requirement set by the nation or the region on the spectrum, the communications devices may use the spectrum, and may not apply for a dedicated spectrum license to a government. To enable communications systems performing wireless communication by using an unlicensed spectrum to coexist on the spectrum friendlily, when performing communication on the unlicensed spectrum, a communications device may follow a principle of Listen Before Talk (LBT). That is to say, before performing signal transmission on a channel of the unlicensed spectrum, the communications device needs to first perform channel listening (or referred to as channel detection). Only when a channel listening result is that the channel is idle, the communications device can perform signal transmission. If a result of channel listening performed by the communications device on the unlicensed spectrum is that the channel is busy, the communications device cannot perform signal transmission. In order to ensure fairness, in one transmission, the time length occupied by a communication device using a channel of the unlicensed spectrum for signal transmission cannot exceed maximum channel occupancy time (MCOT).

In a communication using the unlicensed spectrum, when the network device needs to send (physical downlink control channel) PDCCH to the terminal device, the LBT operation can be performed first, and when the LBT operation is successful, the network device sends the PDCCH.

The PDCCH can support a plurality of types of Downlink Control Information (DCI) formats and aggregation levels but the terminal device may not be able to obtain in advance the information corresponding to the PDCCH sent by the network device. Accordingly, blind detection is needed for the PDCCH. In NR, information, such as DCI formats, aggregation levels, the number of PDCCH candidates corresponding to the aggregate level and monitoring cycles of search spaces in the time domain, can be configured by high-level parameters. Based on the configured information, the complexity of blind detection performed by the terminal device can be flexibly controlled.

However, while the complexity of blind detection is limited, it also causes a decline in scheduling flexibility of the network device, and high requirements are put on a scheduler of the network device.

In order to have less restriction on the scheduler, the number of configured PDCCH candidates supported in the NR can exceed an upper limit of blind detection capability of the terminal device. Also, according to a predefined mechanism, the terminal device can determine the configured PDCCH candidates or a subset of the configured PDCCH candidates within a set of the configured PDCCH candidates, as a to-be-detected set of PDCCH candidates.

In NR, for each downlink band width part (BWP) of a serving cell, 10 search space sets can be configured at most, where each search space set includes search spaces of one or more aggregation levels. In addition, the search space sets correspond to time-domain configuration information, and the terminal device can monitor PDCCH candidates on time-domain positions based on configured search space sets. Accordingly, unlike LTE, there is no need to monitor PDCCH candidates in each downlink subframe.

The time-domain configuration information of the search space sets includes monitoring cycles, time slot offset, the number of time slots, symbol positions, and control resource set index.

The terminal device may monitor PDCCH candidates in the search spaces by two steps. The first step is to determine control channel element (CCE) index in control resource set (CORESET) for each PDCCH candidate in a configured PDCCH candidate set based on the configuration information of the search space set. The second step is to determine a to-be-detected PDCCH candidate set from configured candidate PDCCH sets based on a predetermined rule, where the to-be-detected PDCCH candidate set is a configured candidate PDCCH set or a subset of the configured candidate PDCCH set.

It may be defined an upper limit of blind detection capability of the terminal device for determining a to-be-detected subset from the configured candidate PDCCH set. The blind detection capability includes the number of detected PDCCH candidates and the number of non-overlapping CCEs in each slot. An example is given in Table 1.

TABLE 1

| Subcarrier spacing (kHz) | Maximum number of PDCCH candidates Nmax in each slot | Maximum number of non-overlapping CCEs in each slot |
| --- | --- | --- |
| 15 | 44 | 56 |
| 30 | 36 | 56 |
| 60 | 22 | 48 |
| 120 | 20 | 32 |

The maximum number of PDCCH candidates limits the complexity of blind detection and decoding performed by the terminal device, and the number of non-overlapping CCEs limits the complexity of channel estimation performed by the terminal device.

The method for determining search spaces takes into account the implementation complexity of the terminal device, and it can be adopted a simplified method, which may be described specifically as follows:

1) common search space sets have priority over dedicated search space sets of the terminal device;
2) In the search space sets dedicated to terminal device, a search space set with a small identity (ID) number has priority over a search space set with a large ID number;
3) after the number of PDCCH candidates in each slot or the number of non-overlapping CCEs in each slot is calculated for a configured search space set dedicated to the terminal device, if any of the two indicators in Table 1 is not met, blind detection may not be performed on all the PDCCH candidates in the dedicated search space set of the terminal device, and the blind detection may not be performed on a UE-specific search space set with an ID number greater than the ID number of this search space set.

The search space set in the embodiments of the present application may be configured by means of high-layer signaling, where the configuration information indicated by the high-layer signaling may indicate at least one of the followings:

1) monitoring cycle (that is, the period of PDCCH monitoring) and offset, and symbol position in the time slot;

The monitoring cycle and offset are used to determine monitoring period for monitoring PDCCH and the time slot(s) in which PDCCH needs to be monitored in the monitoring period. The monitoring period may include an integer number of time slots. The symbol position in the time slot is used to determine the starting symbol position of PDCCH in the monitored time slot.

2) aggregation level and its corresponding number of PDCCH candidates.

The aggregation level may include at least one of 1, 2, 4, 8 or 16.

The CORESET in the embodiments of the present application may be configured by means of high-layer signaling, where the configuration information indicated by the high-layer signaling may indicate at least one of the followings:

1) location and size of frequency-domain resources, time-domain length.

The location and size of frequency-domain resources are used to determine the location and size of frequency-domain resources for monitoring PDCCH; the time-domain length is used to determine a corresponding number of PDCCH symbols during PDCCH monitoring.

In the embodiments of the present application, one search space set may correspond to one or more CORESETs, and one CORESET may correspond to one or more search space sets.

In the embodiments of the present application, based on the search space set and CORESET configured by the high-layer signaling, the terminal device can determine PDCCH resource location that needs to be monitored. The resource location may be shown in FIG. 2.

As shown in FIG. 2, the resource size of a filled black part is 48 RBs (which may be an integral multiple of 6) in frequency domain and 2 symbols in time domain. Since 1 REG (abbreviated from Resource Element (RE) group (RE group))=12 subcarriers*1 symbol and 1 CCE=6 REG, the resources in the foregoing filled black part include 16 CCEs, where one CCE is the smallest resource unit that can transmit PDCCH.

A mapping may exist between CCE and REG, for example, it may be interleaving mapping or non-interleaving mapping.

In the embodiments of the present application, the aggregation level may refer to consecutive multiple CCEs used to transmit one PDCCH. For example, when the aggregation level is 2, it means that one PDCCH is transmitted through 2 consecutive CCEs, and when the aggregation level is 8, it means that one PDCCH is transmitted through 8 consecutive CCEs.

One aggregation level and its corresponding number of PDCCH candidates may be considered to constitute one search space.

Assuming that the CCEs in the foregoing CCE set are labeled as CCE 0 to CCE 15 and the starting position for the monitoring is CCE 0 (the starting position for the monitoring can be determined by calculations using a formula or determined based on a hash function or determined by other approaches, and what is given herein is only an exemplary example). For aggregation level 1, the number of PDCCH candidates may be 6; for aggregation level 2, the number of PDCCH candidates may be 4; for aggregation level 4, the number of PDCCH candidates may be 3; and for aggregation level 8 and aggregation level 16, the number of PDCCH candidates may be all 0.

Then, the number of PDCCH candidates in the search space set is 13, and the number of non-overlapping CCEs that need to be monitored by the terminal device is 12, as shown in FIG. 3.

In the embodiments of the present application, the terminal device may be configured with a plurality of search space sets.

The search space sets may include common search space sets (CSS sets) and UE-specific search space sets (USS sets). The terminal device can monitor common PDCCH and/or dedicated PDCCH by the common search space sets and can monitor dedicated PDCCH by the search space sets dedicated to the terminal device. The network device may ensure that the complexity of blind detection of the common search space sets does not exceed the capabilities of the terminal device.

The PDCCH of the search space sets configured by broadcast information may be mainly used to indicate system information receiving, random access responses, and paging messages.

Since the information carried by the broadcast information is limited, the time-domain location, the aggregation levels, the number of candidate control channels and associated control resource sets of the search space set can be configured in a predefined or implicit way.

The aggregation levels of the search space set configured by the broadcast information may be predefined as {aggregation level 4, aggregation level 8, aggregation level 16}, and their corresponding numbers of PDCCH candidates are {4, 2, 1}, respectively.

PDCCH related information in the embodiments of the present application has been introduced above. How the terminal device implements PDCCH monitoring will be described below.

FIG. 4 is a schematic flowchart of a wireless communication method for unlicensed spectrum according to an embodiment of the present application. As shown in FIG. 4, the method 200 includes at least a part of the following content.

In block 210, the terminal device monitors a target downlink signal.

In an embodiment of the present application, the target downlink signal may include common PDCCH, PDCCH dedicated to the terminal device, or a reference signal. The reference signal may be a Channel State Information (CSI)-Reference Signal (RS), a Demodulation Reference Signal (DMRS), a Synchronous Signal Block (SSB), or a Phase Tracking Reference Signal (PT-RS).

Optionally, in an embodiment of the present application, the time resources for the terminal device to monitor the target downlink signal may be default time resources, or the time resources outside the time occupied by channels of the network device. For example, when the terminal device determines to be outside the time occupied by channels of the network device, a monitoring behavior for the target downlink signal monitoring can be used. For another example, when the terminal device is not sure whether it is outside the time occupied by channels of the network device, a monitoring behavior for the target downlink signal monitoring can be used.

Optionally, in an embodiment of the present application, the time when the terminal device monitors the target downlink signal is a first time-point.

Optionally, in an embodiment of the present application, the type of the monitored target downlink signal may be configured at or before the first time-point by the network device to the terminal device by means of high-layer signaling.

Specifically, at or before the first time-point, the network device can determine the type of the target downlink signal that needs to be monitored by the terminal device. For example, if the network device wants the terminal device to reduce the power consumed by monitoring the target downlink signal, the network device can use high-layer signaling to indicate to the terminal device that the target downlink signal that needs to be monitored is a reference signal.

Alternatively, in an embodiment of the present application, the type of the target downlink signal can also be preset on the terminal device based on a protocol.

Optionally, in an embodiment of the present application, the target downlink signal is PDCCH, and this means that the target downlink signal is a signal carried on PDCCH, such as downlink control information.

Also, the terminal device detects PDCCH at the first time-point, and this can be understood as receiving PDCCH correctly at the first time-point. Correctly receiving the PDCCH can be understood as being passed or verified for Cyclic Redundancy Check (CRC) of the PDCCH. The PDCCH received by UE with passed CRC verification can be common PDCCH (for example, it can be group common PDCCH (GC-PDCCH)) and can also be PDCCH dedicated to the terminal device.

In block 210, when the target downlink signal is detected at the first time-point, the terminal device monitors PDCCH from a second time-point, wherein the second time-point is later than the first time-point.

The PDCCH monitored from the second time-point may be PDCCH dedicated to the terminal device, or common PDCCH.

Optionally, if the target downlink signal is detected at the first time-point by the terminal device, it can be considered that the channel has been occupied by the network device, and the terminal device can start monitoring PDCCH from the second time-point. If the target downlink signal is not detected, it can be considered that the channel has not been occupied by network device, the terminal device can use the monitoring behavior for monitoring the target downlink signal to monitor channels.

In an embodiment of the present application, the time duration between the first time-point and the second time-point may be preset (for example, preset on the terminal device based on a protocol) or configured by the network device (for example, configured by means of high-layer signaling).

Alternatively, the time duration between the first time-point and the second time-point may also be determined based on the location of the first time-point in the time slot. For example, the time duration between the first time-point and the second time-point is from where the first time-point starts to the end of the time slot where the first time-point is located, or from where the first time-point starts to the end of a next time slot of the time slot where the first time-point is located.

Alternatively, in an embodiment of the present application, the time duration between the first time-point and the second time-point may be determined based on PDCCH, and specifically, may be determined based on GC-PDCCH. The PDCCH can thus be the target downlink signal mentioned in the embodiments of the present application.

For example, when uplink load of the system is heavy, the network device may send slot format indicator (SFI) indication information on the GC-PDCCH. When the time duration of consecutive downlink resources within channel occupancy time of the network device indicated by the SFI indication information is less than or equal to a predetermined value, the first period of time is the time duration of the downlink resources.

Alternatively, in an embodiment of the present application, the time duration between the first time-point and the second time-point may also be determined based on UE-specific PDCCH, wherein the PDCCH can also be the target downlink signal mentioned in the embodiments of the present application.

For example, the network device may transmit a downlink grant on PDCCH, and the downlink grant schedules PDSCH receiving for the terminal device. When the time duration occupied in time domain by the PDSCH indicated by the downlink grant is greater than a predetermined value, the first period of time is the time duration occupied by the PDSCH in the time domain.

Optionally, in an embodiment of the present application, the time duration between the first time-point and the second time-point may be an integer number of time slots, for example, it can be equal to one or two time slots; or, the time duration between the first time-point and the second time-point may be a non-integer number of time slots, for example, it can be less than 14 symbols, or it can be greater than 1 time slot and less than 2 time slots.

Optionally, in an embodiment of the present application, the first time-point and the second time-point are a same time-point. For example, the target downlink signal is a reference signal. If the reference signal is detected at the first time-point by the terminal device, it can be considered that the channel has been occupied by the network device, and the terminal device can start monitoring PDCCH from the first time-point. If the reference signal is not detected, it can be considered that the channel has not been occupied by network device, the terminal device can use the monitoring behavior for monitoring the reference signal to monitor channels.

Optionally, in an embodiment of the present application, the terminal device may not monitor PDCCH between the first time-point and the second time-point.

Specifically, in an embodiment of the present application, when the target downlink signal is detected by the terminal device at the first time-point, the terminal device may not monitor PDCCH between the first time-point and the second time-point. In this case, it may not need to satisfy any condition, and the terminal device does not perform PDCCH monitoring as such. Alternatively, when a certain condition is met, the terminal device may not perform the PDCCH monitoring between the first time-point and the second time-point; otherwise, the PDCCH monitoring is performed. The target downlink signal is the PDCCH dedicated to the terminal device, and this condition may include at least one of the followings:

1) The end of PDSCH scheduled by the PDCCH dedicated to the terminal device is the boundary of a time slot;

Specifically, if the end of PDSCH scheduled by the PDCCH dedicated to the terminal device is the boundary of a time slot, it means that the network devices may send PDCCH from a next time slot, and the terminal device can start the PDCCH monitoring from the next time slot.

2) The time duration of PDSCH scheduled by the PDCCH dedicated to the terminal device is greater than predetermined time duration;

Specifically, if the time duration of PDSCH scheduled by the PDCCH dedicated to the terminal device is greater than predetermined time duration, it implies that there is enough time for two PDCCHs to be transmitted, and it can be started for a next PDCCH monitoring.

3) The end of PDSCH scheduled by the PDCCH dedicated to the terminal device is the second time-point;

Specifically, if the end of PDSCH scheduled by the PDCCH dedicated to the terminal device is the second time-point when the PDCCH monitoring is needed to be performed, the PDCCH monitoring can be started from this time-point.

4) A to-be-monitored PDCCH set is included between the first time-point and the end of PDSCH scheduled by the PDCCH dedicated to the terminal device.

Specifically, if the dedicated PDCCH is detected at the first time-point by the terminal device and the dedicated PDCCH schedules PDSCH transmission, it implies that the terminal device should perform PDSCH receiving on the time resources between the first time-point and the end of the PDSCH. If the to-be-monitored PDCCH set is included on the time resources, it may not perform monitoring for the to-be-monitored PDCCH set included on the time resources, and a next PDCCH monitoring can be started as such.

In other words, the period of the to-be-monitored PDCCH set is M symbols, and the number of symbols occupied by PDSCH scheduled by the dedicated PDCCH to the terminal device is greater than M. Then, the terminal device may not perform the PDCCH monitoring between the first time-point and the second time-point.

Optionally, in an embodiment of the present application, the terminal device monitors PDCCH between the first time-point and the second time-point.

Specifically, in an embodiment of the present application, when the target downlink signal is detected by the terminal device at the first time-point, the terminal device may monitor PDCCH between the first time-point and the second time-point. In this case, it may not need to satisfy any condition, and the terminal device performs PDCCH monitoring as such.

Alternatively, when a certain condition is met, the terminal device may perform the PDCCH monitoring between the first time-point and the second time-point; otherwise, the PDCCH monitoring is not performed. This condition can include one of the followings:

1) The target downlink signal is a reference signal;

Specifically, the terminal device uses a reference signal to monitor the target downlink signal. When the terminal device detects that the network device performs transmission of a downlink reference signal, the terminal device needs to perform blind detection of PDCCH to determine whether the network device performs downlink scheduling or uplink scheduling for the terminal device, or whether the network device performs transmission of common information.

2) The target downlink signal is common PDCCH;

Specifically, the common PDCCH may be SFI indication information. After receiving the SFI indication information, the terminal device performs blind detection of PDCCH based on time slot format indicated by the SFI indication information to determine whether the network device performs downlink scheduling or uplink scheduling for the terminal device, or whether the network device performs transmission of common information.

3) The target downlink signal is PDCCH dedicated to the terminal device, and the end of PDSCH scheduled by the PDCCH dedicated to the terminal device is not the boundary of a time slot and/or the time duration of the scheduled PDSCH is less than or equal to predetermined time duration. As an exemplary example, the predetermined time duration may be an integer number of symbols less than one time slot.

Specifically, the period of a to-be-monitored PDCCH set is M symbols, and the number of symbols occupied by PDSCH scheduled by the dedicated PDCCH to the terminal device is less than or equal to M. Then, the terminal device may perform PDCCH monitoring between the first time-point and the second time-point.

The PDCCH monitoring between the first time-point and the second time-point may be to monitor PDCCH only during a part of period of time between the first time-point and the second time-point, for example, the PDCCH may be monitored within a period of time between the end of PDSCH scheduled by the dedicated PDCCH (the target downlink signal) to the terminal device and the second time-point.

Optionally, in an embodiment of the present application, the terminal device correctly receives PDCCH dedicated to the terminal device at the first time-point, and the end of PDSCH scheduled by the PDCCH is a third time-point, then the terminal device does not perform the PDCCH monitoring from the first time-point to the third time-point, wherein the third time-point may be earlier than or equal to the second time-point.

Figure 5:
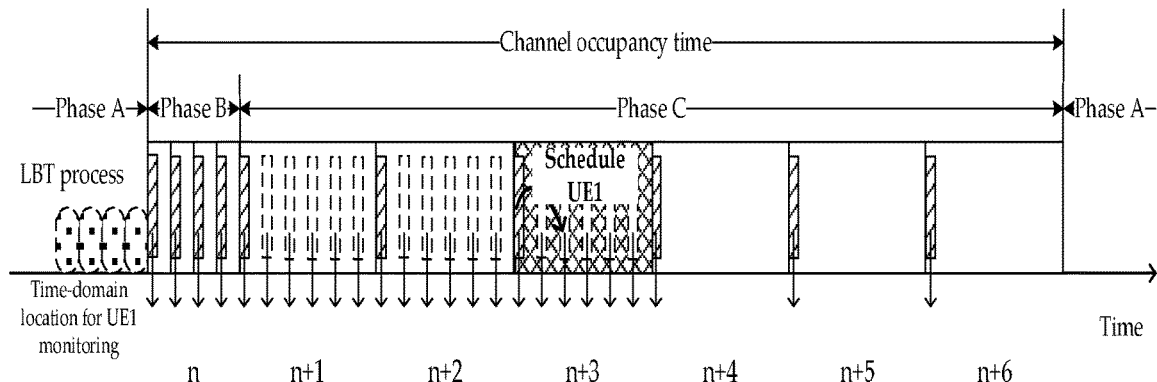
FIG. 5 is a schematic diagram illustrating a method for monitoring PDCCH by a terminal device according to an embodiment of the present application.

As shown in FIG. 5, UE1 receives PDCCH transmitted by the network device for the first time in the time slot n+3. The PDCCH schedules PDSCH. The end of the PDSCH is the end of the time slot n+3. In this circumstance, after the PDCCH is detected by UE1 in the time slot n+3, UE1 may no longer perform PDCCH monitoring in the time slot n+3. Furthermore, UE1 may start the PDCCH monitoring from the time slot n+4 based on a second PDCCH monitoring behavior.

Optionally, in an embodiment of the present application, when the target downlink signal is PDCCH, a way for the terminal device to monitor PDCCH at the first time-point or before the first time-point may be monitoring mode 1.

Optionally, in an embodiment of the present application, a way for the terminal device to monitor PDCCH between the first time-point and the second time-point is monitoring mode 2.

Optionally, in an embodiment of the present application, a way for the terminal device to monitor PDCCH from the second time-point is monitoring mode 3.

For the foregoing monitoring mode 1, monitoring mode 2 or monitoring mode 3, a single time unit includes one or more to-be-monitored PDCCH sets, and the number of PDCCH candidates included in each of the to-be-monitored PDCCH sets is the same. The time unit in an embodiment of the present application may be a time slot, a mini-slot, a subframe or a frame.

Specifically, under a circumstance that maximum number of blind detections by the terminal equipment in each time slot (that is, maximum number of PDCCH candidates in each time slot) does not exceed current capability limits, the number of blind detections is evenly allocated to each to-be-monitored PDCCH set. This implementation is relatively simple.

For example, for the monitoring mode 1 or the monitoring mode 2, the number of blind detections (that is, the number of PDCCH candidates) included in each time slot is N1, where N1 is less than or equal to N max (i.e., maximum number of blind detections in each time slot for the terminal device). It is assumed that each time slot includes M1 to-be-monitored PDCCH sets. Then, the number of blind detections included in each to-be-monitored PDCCH set is the same and is P1, wherein M1*P1 is less than or equal to N1.

Assuming that an available frequency band may be divided into at least one subband, the M1 to-be-monitored PDCCH sets can be the to-be-monitored PDCCH sets located at the same subband but on different symbols in each time slot, and can also be the to-be-monitored PDCCH sets located on the same symbols but at different subbands in each time slot, and can also include to-be-monitored PDCCH sets, of which at least one of subband positions or symbol positions are different in each time slot.

For example, for the monitoring mode 3, the number of blind detections included in each time slot is N2, where N2 is less than or equal to N max. It is assumed that each time slot includes M2 to-be-monitored PDCCH sets. Then, the number of blind detections included in each to-be-monitored PDCCH set is the same and is P2, wherein M2*P2 is less than or equal to N2.

Similarly, assuming that an available frequency band may be divided into at least one subband, the M2 to-be-monitored PDCCH sets can then be to-be-monitored PDCCH sets located at the same subband but on different symbols in each time slot, and can also be the to-be-monitored PDCCH sets located on the same symbols but at different subbands in each time slot, and can also include to-be-monitored PDCCH sets, of which at least one of subband positions or symbol positions are different in each time slot.

Optionally, N1=N2, that is, the number of blind detections included in each time slot in the monitoring mode 1 or 2 is as the same as the number of blind detections included in each time slot in the monitoring mode 3.

Similarly, for the foregoing monitoring mode 1, monitoring mode 2 or monitoring mode 3, a single time unit includes one or more to-be-monitored PDCCH sets, and the number of CCEs included in each of the to-be-monitored PDCCH sets is the same.

Optionally, in an embodiment of the present application, for the foregoing monitoring mode 1, monitoring mode 2 or monitoring mode 3, a single time unit includes a plurality of to-be-monitored PDCCH sets, and at least two to-be-monitored PDCCH sets in the plurality of to-be-monitored PDCCH sets include different numbers of PDCCH candidates.

For example, for the monitoring mode 1 or the monitoring mode 2, two to-be-monitored PDCCH sets are included in one time slot, wherein the number of blind detections corresponding to one to-be-monitored PDCCH set is X, the number of blind detections corresponding to the other to-be-monitored PDCCH set is Y, and X is greater than Y.

Similarly, for the foregoing monitoring mode 1, monitoring mode 2 or monitoring mode 3, a single time unit includes one or more to-be-monitored PDCCH sets, and in the case that the single time unit includes a plurality of to-be-monitored PDCCH sets, at least two to-be-monitored PDCCH sets include different numbers of CCEs.

Optionally, in an embodiment of the present application, for the foregoing monitoring mode 1, monitoring mode 2 and monitoring mode 3, the number of PDCCH candidates (or the number of CCEs) included in a single time slot or the number of PDCCH candidates (or the number of CCEs) included in the to-be-monitored PDCCH set that correspond to one monitoring mode can be determined based on the number of PDCCH candidates (or the number of CCEs) included in a single time slot or the number of PDCCH candidates (or the number of CCEs) included in the to-be-monitored PDCCH set that correspond to other monitoring modes.

For example, for the monitoring mode 1 and the monitoring mode 2, it is assumed that each time slot includes M1 to-be-monitored PDCCH sets, and then the number of PDCCH blind detections corresponding to each to-be-monitored PDCCH set is the same and is P1; for the monitoring mode 3, it is assumed that each time slot includes M2 to-be-monitored PDCCH sets, and then the number of blind detections includes in each to-be-monitored PDCCH set is the same and is P1. Also, the number of blind detections included in each time slot corresponding to the monitoring mode 1 and/or the monitoring mode 2 is greater than the number of blind detections included in each time slot corresponding to the monitoring mode 3.

It is to be understood that in an embodiment of the present application, the foregoing monitoring mode 1, monitoring mode 2 and monitoring mode 3 may be a same monitoring mode, or may be monitoring methods different from one another. Alternatively, the monitoring mode 1 and the monitoring mode 2 are the same but are different from the monitoring mode 3.

Alternatively, the monitoring mode 2 and the monitoring mode 3 are the same but are different from the monitoring mode 1.

The monitoring mode for monitoring PDCCH according to an embodiment of the present application may indicate at least one of the following aspects: the period of PDCCH monitoring, the number of to-be-monitored PDCCH sets included in a single time unit, the number of PDCCH candidates included in the to-be-monitored PDCCH set, the position of resources of PDCCH candidates included in the to-be-monitored PDCCH set, the number of CCEs included in the to-be-monitored PDCCH set, the position of resources of CCEs included in the to-be-monitored PDCCH set, the number of PDCCH candidates included in a single time unit, the position of resources of PDCCH candidates included in a single time unit, the number of CCE resources included in a single time unit and the position of resources of CCEs included in a single time unit.

Optionally, in an embodiment of the present application, the to-be-monitored PDCCH set may include a plurality of CCEs, and the plurality of CCEs may constitute at least one PDCCH candidate.

Optionally, in an embodiment of the present application, a single to-be-monitored PDCCH set may include at least one group of search space sets.

One group of search space sets may include one or more search space sets.

Optionally, in an embodiment of the present application, the to-be-monitored PDCCH sets may include a search space set dedicated to the terminal device and/or a common search space set.

For example, the search space sets configured for the terminal device include search space sets 0, 5, and 6, wherein the search space set 0 is a common search space set, the search space sets 5 and 6 are search space sets dedicated to the terminal device, and the to-be-monitored PDCCH sets include the search space sets 5 and 6.

Alternatively, in an embodiment of the present application, a group of search space sets in a single time unit are divided into at least one to-be-monitored PDCCH set.

Optionally, in an embodiment of the present application, a single to-be-monitored PDCCH set corresponds to at least one control resource set (CORESET) at the same time-domain location.

For example, in frequency domain, an available frequency band may be divided into a plurality of subbands, and each subband is configured with CORESET. Then, a single to-be-monitored PDCCH set corresponds to a plurality of CORESETs at the same time-domain location.

Alternatively, in frequency domain, an available frequency band may be divided into a plurality of subbands, and each subband is configured with CORESET. Then, a single to-be-monitored PDCCH set corresponds to CORESET of one subband.

Optionally, in an embodiment of the present application, PDCCH candidates included in the to-be-monitored PDCCH set may refer to PDCCH candidates configured by the network device for monitoring, can also be PDCCH candidates that actually need to be monitored by the terminal (for example, the terminal device may determine the PDCCH candidates that actually need to be monitored, based on its own capability limits or the limits shown in Table 1), or can also be maximum number of PDCCH candidates obtained based on all the CCEs included in the to-be-monitored PDCCH set.

Optionally, in an embodiment of the present application, the CCEs included in the to-be-monitored PDCCH set may refer to all the CCEs constitute the to-be-monitored PDCCH set.

Optionally, in an embodiment of the present application, the CCEs included in the to-be-monitored PDCCH set may refer to all the CCEs corresponding to the PDCCH candidates included in the to-be-monitored PDCCH set.

In an embodiment of the present application, the time-domain length occupied by a plurality of to-be-monitored PDCCH sets included in a single time unit may be the same or may not be the same.

It is assumed below that a PDCCH monitoring mode between the first time-point and the second time-point and/or the way to monitor PDCCH at the first time-point are a first monitoring mode; and the way to monitor PDCCHs from the second time-point is a second monitoring mode. The first monitoring mode is different from the second monitoring mode.

Optionally, in an embodiment of the present application, the first monitoring mode and the second monitoring mode are different in at least one of the following aspects 1)-10):

1) PDCCH Monitoring Cycle

One period of the PDCCH monitoring may include one or more time units, wherein the time unit mentioned in the embodiments of the present application may be a time slot, a mini-slot, a subframe or a frame. The period of the PDCCH monitoring mentioned here may be the monitoring period as shown in FIG. 2.

The monitoring period of the first monitoring mode may be less than or equal to the monitoring period of the second monitoring mode. For example, the monitoring period of the first monitoring mode is a mini-slot, and the monitoring period of the second monitoring mode is a time slot.

2) The Number of to-be-Monitored PDCCH Sets Included in a Single Time Unit

One time unit may include one or more to-be-monitored PDCCH sets.

The number of to-be-monitored PDCCH sets included in one time unit in the first monitoring mode may be greater-than or equal to the number of to-be-monitored PDCCH sets included in one time unit in the second monitoring mode.

For a same monitoring mode, the number of PDCCH candidates and/or CCEs in the to-be-monitored PDCCH sets included in each time unit may be the same or may be different.

Alternatively, for a same monitoring mode, at least two to-be-monitored PDCCH sets in the to-be-monitored PDCCH sets included in one time unit include different numbers of PDCCH candidates and/or CCEs.

3) The Number of PDCCH Candidates Included in the to-be-Monitored PDCCH Set

One time unit includes one or more to-be-monitored PDCCH sets, and the number of PDCCH candidates included in the to-be-monitored PDCCH set corresponding to different monitoring modes may not be the same.

For example, for the first monitoring mode, it includes three to-be-monitored PDCCH sets, the numbers of PDCCH candidates included in the three to-be-monitored PDCCH sets are 5, 6 and 8, respectively; for the second monitoring mode, it also includes three to-be-monitored PDCCH sets, and the numbers of PDCCH candidates included in the three to-be-monitored PDCCH sets are all 6. It can be considered that the number of PDCCH candidates included in the to-be-monitored PDCCH set is different in the two monitoring modes.

4) The Position of Resources of PDCCH Candidates Included in the to-be-Monitored PDCCH Set The position of resources of PDCCH candidates included in the to-be-monitored PDCCH set may include at least one of frequency-domain position and time-domain position.

The position of resources of PDCCH candidates included in the to-be-monitored PDCCH set is different in different monitoring modes. This may refer to different time-domain locations and/or different frequency-domain locations, wherein the different time-domain locations may refer to different positions (which may be symbol positions, more specifically) of occupied time-domain resources in the time unit (e.g., a time slot) by the PDCCH candidates.

5) The Number of CCEs Included in the to-be-Monitored PDCCH Set

One to-be-monitored PDCCH set may include one or more CCEs. The numbers of CCEs included in the to-be-monitored PDCCH sets corresponding to different monitoring modes may not be the same.

For example, for the first monitoring mode, it includes three to-be-monitored PDCCH sets, the numbers of CCEs included in the three to-be-monitored PDCCH sets are 10, 12 and 8, respectively; for the second monitoring mode, it also includes three to-be-monitored PDCCH sets, and the numbers of PDCCH candidates included in the three to-be-monitored PDCCH sets are all 10. It can be considered that the number of CCEs included in the to-be-monitored PDCCH set is different in the two monitoring modes.

6) The Position of Resources of CCEs Included in the to-be-Monitored PDCCH Set

The position of resources of CCEs included in the to-be-monitored PDCCH set is different in different monitoring modes. This may refer to different time-domain locations and/or different frequency-domain locations, wherein the different time-domain locations may refer to different positions (which may be symbol positions, more specifically) of occupied time-domain resources in the time unit (e.g., a time slot) by the CCEs.

7) The Number of PDCCH Candidates Included in a Single Time Unit

For different monitoring modes, the number of PDCCH candidates included in one time unit may be different.

8) The Position of Resources of PDCCH Candidates Included in a Single Time Unit

The position of resources of PDCCH candidates included in one single time unit is different in different monitoring modes. This may refer to different time-domain locations and/or different frequency-domain locations, wherein the different time-domain locations may refer to different positions (which may be symbol positions, more specifically) of occupied time-domain resources in the time unit (e.g., a time slot) by the PDCCH candidates.

9) The Number of Resources of CCEs Included in a Single Time Unit

For different monitoring modes, the number of resources of CCEs included in one time unit may be different. In one implementation, the CCEs included in a single time unit in the second monitoring mode may be a subset of the CCEs included in a single time unit in the first monitoring mode.

10) The Position of Resources of CCEs Included in a Single Time Unit

The position of resources of CCEs included in one single time unit is different in different monitoring modes. This may refer to different time-domain locations and/or different frequency-domain locations, wherein the different time-domain locations may refer to different positions (which may be symbol positions, more specifically) of occupied time-domain resources in the time unit (e.g., a time slot) by the CCEs.

The differences between the first monitoring mode and the second monitoring mode are described above. The relationship between the first monitoring mode and the second monitoring mode will be described below by way of examples.

Before the first monitoring mode and the second monitoring mode will be illustrated, an exemplary example of downlink transmission performed by a base station will be described with reference to FIG. 5 for ease of understanding.

For an unlicensed spectrum, the base station needs to perform Listen Before Talk (LBT) before sending PDCCH. Transmission is allowed only when the LBT succeeds. If the LBT fails, transmission is not allowed. Therefore, a transmission using the unlicensed spectrum is opportunistic. In order to enable the base station to use unlicensed spectrum resources to perform PDCCH transmission as soon as possible, one way is to allow the base station to use a smaller time granularity, such as a mini-slot with a length of 2 symbols, to perform PDCCH preparation and transmission when preempting the channel, and use a larger time granularity, such as a time slot, to perform PDCCH preparation and transmission within channel occupancy time after the base station preempts the channel.

As shown in FIG. 5, the scheduling behavior of the base station includes the following phases:

Phase A: falling outside the channel occupancy time of the base station, the base station uses a smaller time granularity to prepare data for transmission. Phase B: at an initial stage of the channel occupancy time of the base station, the base station uses a smaller time granularity for data transmission. Phase C: within the channel occupancy time of the base station except for the initial stage, the base station uses a larger time granularity for data transmission.

Correspondingly, the PDCCH blind detection behavior of the terminal device also includes the following phases:

Phase A: falling outside the channel occupancy time of the base station, the terminal device uses a smaller time granularity to perform PDCCH monitoring. Phase B: at an initial stage of the channel occupancy time of the base station, the terminal device uses a smaller time granularity to perform PDCCH monitoring. Phase C: within the channel occupancy time of the base station except for the initial stage, the terminal device uses a larger time granularity to perform PDCCH monitoring.

Specifically, the base station may configure two types of PDCCH monitoring periods for the terminal device. One has a smaller PDCCH monitoring period, such as a mini-slot, and the other has a larger PDCCH monitoring period, such as a time slot. In phase A and phase B, the terminal device performs PDCCH monitoring based on the PDCCH monitoring period corresponding to the mini-slot. In phase C, the terminal device performs PDCCH monitoring based on the PDCCH monitoring period corresponding to the time slot. By such a way, it can not only ensure that the base station can perform downlink transmission as soon as possible after the base station preempts the channel, but also reduce the monitoring complexity of the terminal device during the channel occupancy time of the base station.

However, the phase B expected by the network side and the phase B expected by the terminal side may be different. For example, in order to ensure the reliability of judgment of the terminal device on when the base station starts signal transmission, the terminal device may consider the base station to start sending downlink signals only after correctly receiving PDCCH (that is, CRC verification of the PDCCH is passed). Because not all UEs can receive PDCCH when the phase B starts at the network side, the phases considered by the UEs and the phases considered by the network device may be different. For example, as shown in FIG. 5, the phase A considered by the network side includes time slots before the time slot n, at the time channel resources has not been preempted, the phase B includes the time slot n, and the phase C includes the time slot n+1 to the time slot n+6. However, for UE1, UE1 receives the PDSCH scheduled by the network device for the first time in the time slot n+3 within the channel occupancy time of the base station. As a result, the phase A considered by UE1 includes time slots corresponding to unreceived downlink signals before the time slot n+3, the phase B includes the time slot n+3, and the phase C includes the time slot n+4 to the time slot n+6. That is to say, the switching by UE1 from the first monitoring mode (applicable to the phase A and phase B) to the second monitoring mode (applicable to the phase C) starts from the time slot n+4.

It is to be understood that the switching by UE between the first monitoring mode and the second monitoring mode should not affect PDSCH receiving by the UE. In other words, in a situation that the network device performs PDCCH transmission when assuming that UE performs PDCCH monitoring based on the second monitoring mode, performing the monitoring by the UE based on the first monitoring mode should be able to correctly receive the PDCCH transmitted by the network device.

Therefore, the PDCCH resources monitored in a single time unit by means of the second monitoring mode are a subset of the PDCCH resources monitored in a single time unit by means of the first monitoring mode.

It can be seen from FIG. 5 that the terminal device has different time-domain monitoring densities for PDCCH in different time slots, for example, the monitoring density in the phase A and the phase B is higher than that of the phase C. It can be seen from Table 1 that the terminal device is limited in maximum number of blind detections in each time slot (that is, maximum number of PDCCH candidates in each time slot). The terminal device is also limited in maximum number of CCEs in each time slot (that is, the number of CCEs that needs channel estimation to be performed in each time slot).

It is assumed that the maximum number of PDCCH candidates in each time slot is 36, each time slot includes 6 to-be-monitored PDCCH sets in the phase A or the phase B, and each time slot includes one to-be-monitored PDCCH set in the phase C. If the blind detections are evenly allocated to the to-be-monitored sets, maximum number of blind detections corresponding to each to-be-monitored PDCCH set is 6 in the phase A or the B, and maximum number of blind detections corresponding to each to-be-monitored PDCCH set is 36 in the phase C.

Figure 6:
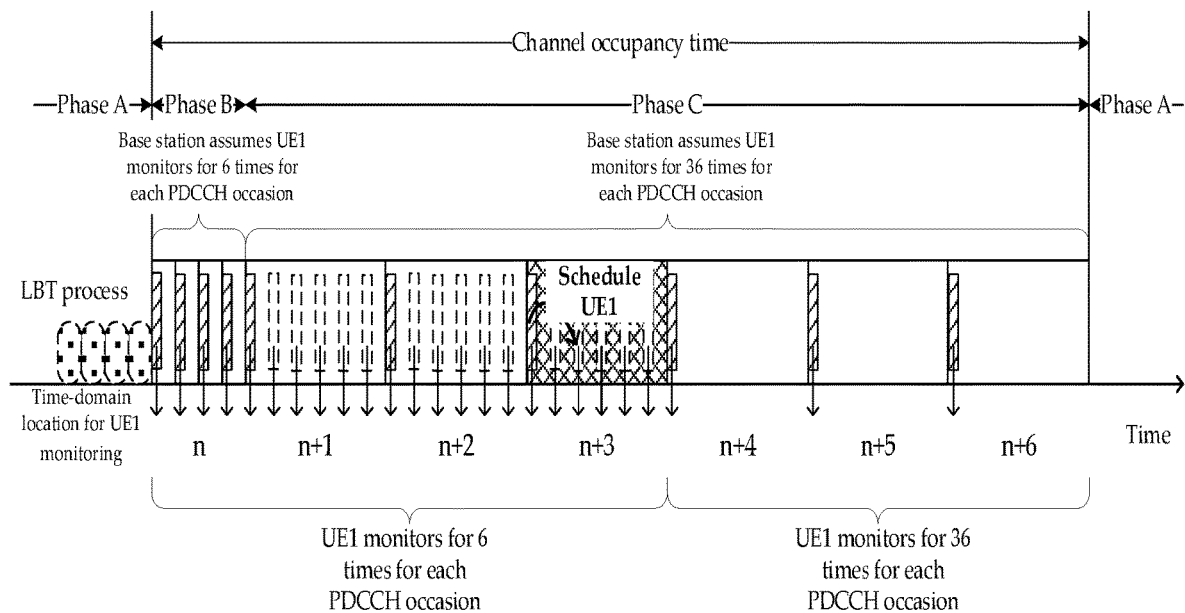
FIG. 6 is a schematic diagram illustrating a method for monitoring PDCCH by a terminal device according to an embodiment of the present application.

The phases A, B and C considered by the network device may be inconsistent with the phases A, B and C considered by the terminal device. As shown in FIG. 6, if the network device uses one of last 30 PDCCH candidates (i.e., last 30 blind detections) of the 36 blind detections in the to-be-monitored PDCCH set in the time slot n+3 to schedule UE1, UE1 cannot receive the PDCCH scheduled by the network device because UE1 detects only for 6 times in the to-be-monitored PDCCH set (UE1 considers itself to be in the phase A).

That is, even if PDCCH monitoring resources corresponding to the phase A or the phase B are a subset of PDCCH monitoring resources corresponding to the phase C, the terminal device may still not receive the PDCCH scheduled by the network device in the phase C when using the PDCCH monitoring mode corresponding to the phase A or the phase B.

Therefore, the blind detections performed in the phase C can be a subset of the blind detections performed in the phase A/B. That is, the PDCCH candidates monitored in the phase C are a subset of the PDCCH candidates monitored in the phase A/B. In such a way, it can be ensured that the PDCCH sent by the base station can be detected by UE based on the first monitoring mode in the situation that the base station sends the PDCCH with an assumption that UE will monitor the PDCCH based on the second monitoring mode.

Optionally, in an embodiment of the present application, the PDCCH candidates included in the to-be-monitored PDCCH sets in the second monitoring mode are a subset of the PDCCH candidates included in the to-be-monitored PDCCH sets in the first monitoring mode, or the CCEs included in the to-be-monitored PDCCH sets in the second monitoring mode are a subset of the CCEs included in the to-be-monitored PDCCH sets in the first monitoring mode.

Optionally, in an embodiment of the present application, the PDCCH candidates included in a single time unit in the second monitoring mode are a subset of the PDCCH candidates included in a single time unit in the first monitoring mode, or the CCEs included in a single time unit in the second monitoring mode are a subset of the CCEs included in a single time unit in the first monitoring mode.

Optionally, in an embodiment of the present application, the PDCCH candidates included in a first aggregation level in a single time unit in the second monitoring mode are a subset of the PDCCH candidates included in the first aggregation level in a single time unit in the first monitoring mode.

Optionally, in an embodiment of the present application, the to-be-monitored PDCCH sets included in a single time unit in the second monitoring mode is at least part of the to-be-monitored PDCCH sets included in a single time unit in the first monitoring mode.

Optionally, the at least part of the to-be-monitored PDCCH sets is the to-be-monitored PDCCH set, among the to-be-monitored PDCCH sets included in a single time unit in the first monitoring mode, including the largest number of PDCCH candidates.

Alternatively, the at least part of the to-be-monitored PDCCH sets is the to-be-monitored PDCCH set, among the to-be-monitored PDCCH sets included in a single time unit in the first monitoring mode, including the largest number of CCEs.

Optionally, in the first monitoring mode, the to-be-monitored PDCCH sets included in a single time unit include a first group of PDCCH candidate sets and a second group of PDCCH candidate sets; in the second monitoring mode, the to-be-monitored PDCCH sets included in a single time unit include the first group of PDCCH candidate sets.

For example, for the first monitoring mode, it is assumed that each time slot includes a first to-be-monitored PDCCH set and a second to-be-monitored PDCCH set, wherein the number of blind detections included in the first to-be-monitored PDCCH set is X, and the number of blind detections included in the second to-be-monitored PDCCH set is Y; for the second monitoring mode, it is assumed that each time slot includes a first to-be-monitored PDCCH set, and the number of blind detections included in the first to-be-monitored PDCCH set is X. The number of blind detections included in each time slot in the first monitoring mode is greater than the number of blind detections included in each time slot in the second monitoring mode. Optionally, X is greater than Y.

Optionally, the PDCCH candidates included in each to-be-monitored PDCCH set corresponding to the second monitoring mode are a subset of the PDCCH candidates included in each to-be-monitored PDCCH set corresponding to the first monitoring mode. That is to say, P2 mentioned above is less than or equal to P1.

For example, in the example shown in FIG. 6, maximum number of blind detections corresponding to each to-be-monitored PDCCH set in the phase C is less than or equal to 6. Taking the number of blind detections as 6 as an example, the network device also uses one of the 6 PDCCH candidates in the to-be-monitored PDCCH set in the time slot n+3 to schedule for UE1, and UE1 can still receive correctly the PDCCH when monitoring based on the first monitoring mode.

Optionally, the PDCCH candidates included in first aggregation level in each to-be-monitored PDCCH set corresponding to the second monitoring mode are a subset of the PDCCH candidates included in first aggregation level in each to-be-monitored PDCCH set corresponding to the first monitoring mode.

For example, the number of PDCCH candidates corresponding to the aggregation level 4 in each to-be-monitored PDCCH set in the phase A or the phase B is 6, and the number of PDCCH candidates corresponding to the aggregation level 4 in each to-be-monitored PDCCH set in the phase C is less than or equal to 6.

However, this method has a new problem. That is, in the phase corresponding to the second monitoring mode, the number of PDCCH candidates that can be used by the network device is limited. Since the network device needs to perform PDCCH scheduling on multiple UEs, the network device usually multiplexes the PDCCHs of multiple UEs on adjacent CCE resources. This case will result in a higher collision probability when the network device performs PDCCH scheduling for UE. Accordingly, scheduling requirements of the network device increase.

Therefore, the blind detections in multiple to-be-monitored PDCCH sets included in each time slot can be non-equally distributed to solve the collision problem that may occur when the network device performs the PDCCH scheduling.

For example, for the second monitoring mode, the number of blind detections included in each time slot is N2, where N2 is less than or equal to N max. It is assumed that each time slot includes a first group of to-be-monitored PDCCH sets. Then, the number of blind detections included in the first group of to-be-monitored PDCCH sets is X, where X is less than or equal to N2.

If the first group of to-be-monitored PDCCH sets includes at least two to-be-monitored PDCCH sets, then each of the at least two to-be-monitored PDCCH sets includes a same number of blind detections.

For the first PDCCH monitoring mode, the number of blind detections included in each time slot is N1, and N1 is less than or equal to N max. It is assumed that each time slot includes a first group of to-be-monitored PDCCH sets and a second group of to-be-monitored PDCCH sets, wherein the number of blind detections included in the first group of to-be-monitored PDCCH sets is X, and the number of blind detections included in the second group of to-be-monitored PDCCH sets is Y. If the second group of to-be-monitored PDCCH sets includes at least two to-be-monitored PDCCH sets, then each of the at least two to-be-monitored PDCCH sets includes a same number of blind detections. Optionally, X is greater than Y.

Optionally, the number of blind detections included in each time slot in the first monitoring mode is different from the number of blind detections included in each time slot in the second monitoring mode. For example, the number of blind detections included in each time slot in the first monitoring mode is greater than the number of blind detections included in each time slot in the second monitoring mode. In other words, N2 is less than N1 and less than or equal to N max.

Optionally, in an embodiment of the present application, a single to-be-monitored PDCCH set may include at least one group of search space sets.

Optionally, the PDCCH candidates included in a first search space in each to-be-monitored PDCCH set corresponding to the second monitoring mode are a subset of the PDCCH candidates included in the first search space in each to-be-monitored PDCCH set corresponding to the first monitoring mode.

Figure 7:
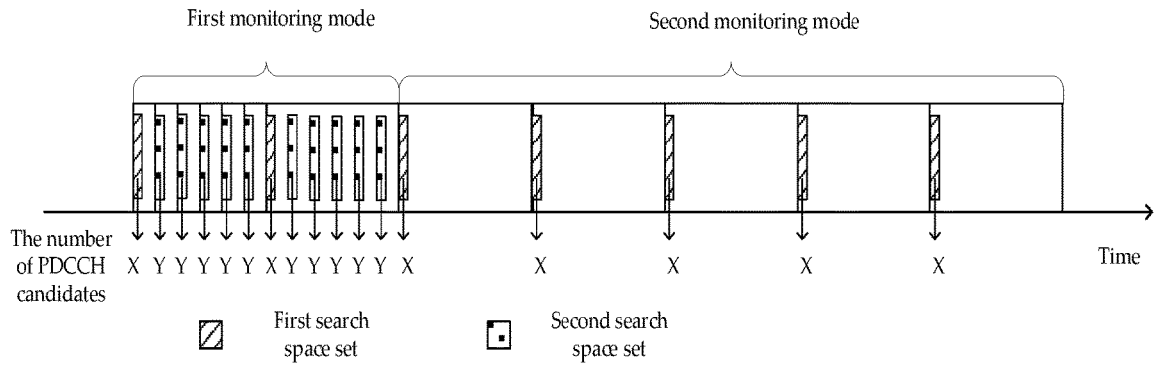
FIG. 7 is a schematic diagram illustrating a method for monitoring PDCCH by a terminal device according to an embodiment of the present application.

FIG. 7 gives an exemplary example of allocating PDCCH blind detections for different monitoring modes. As shown in FIG. 7, the first monitoring mode includes detections on a first search space set, and the second monitoring mode includes detections on a second search space set, wherein the detection granularity of the first search space set in time domain is 6 to-be-monitored PDCCH sets per time slot, and the detection granularity of the second search space set in time domain is one to-be-monitored PDCCH set per time slot.

The to-be-monitored PDCCH set included in the second search space set in each time slot is the first to-be-monitored PDCCH set among the 6 to-be-monitored PDCCH sets included in the first search space set in each time slot. Therefore, when allocating the number of blind detections, the network device allocates a same number of blind detections, X times, to the first to-be-monitored PDCCH set included in the first search space set in each time slot and the to-be-monitored PDCCH set included in the second search space set in each time slot. The network device allocates a same number of blind detections, Y times, to each of the remaining 5 to-be-monitored PDCCH sets, except for the first one, included in the first search space set in each time slot.

Among them, X+5*Y is less than or equal to N max.

Optionally, in an embodiment of the present application, a group of search space sets may be divided into a plurality of to-be-monitored PDCCH sets, wherein the number of PDCCH candidates included in each of the to-be-monitored PDCCH sets may be the same or different.

Figure 8:
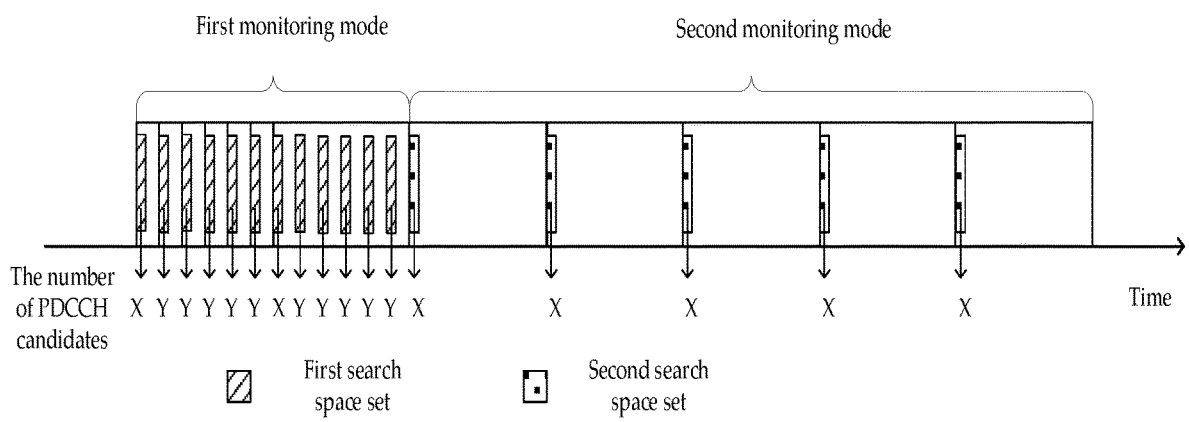
FIG. 8 is a schematic diagram illustrating a method for monitoring PDCCH by a terminal device according to an embodiment of the present application.

FIG. 8 gives another exemplary example of allocating PDCCH blind detections for different monitoring modes.

As shown in FIG. 8, the first monitoring mode includes detections on a first search space set and a second search space set, and the second monitoring mode includes detections on the first search space set, wherein the detection granularity of the first search space set in time domain is one to-be-monitored PDCCH set per time slot, and the detection granularity of the second search space set in time domain is 5 to-be-monitored PDCCH sets per time slot.

The network device allocates a number of blind detections, X times, to each to-be-monitored PDCCH set included in the first search space set in each time slot and allocates a number of blind detections, Y times, to each to-be-monitored PDCCH set included in the second search space set in each time slot.

The number of blind detections in the time slot corresponding to the first PDCCH monitoring behavior is X+5*Y, wherein X+5*Y is less than or equal to N max.

FIG. 8 gives an exemplary example of the first search space set and the second search space set. It should be understood that the first search space set and the second search space set may also have other examples, and the present application does not put limits on this. For example, the ID number of the first search space set is smaller than the ID number of the second search space set; in other words, the priority of the first search space set is higher than the priority of the second search space set. The monitoring period of the first search space set may be greater than the monitoring period of the second search space set, wherein the CCEs included in the first search space set may or may not overlap with the CCEs included in the second search space set. The terminal device monitors the first search space set and the second search space set in the first monitoring mode and monitors the first search space set in the second monitoring mode. This can ensure that the monitoring of the first search space set can be performed at different phases.

Optionally, in an embodiment of the present application, the terminal device may determine the first monitoring mode and the second monitoring mode based on the configuration information sent by the network device.

Figure 9:
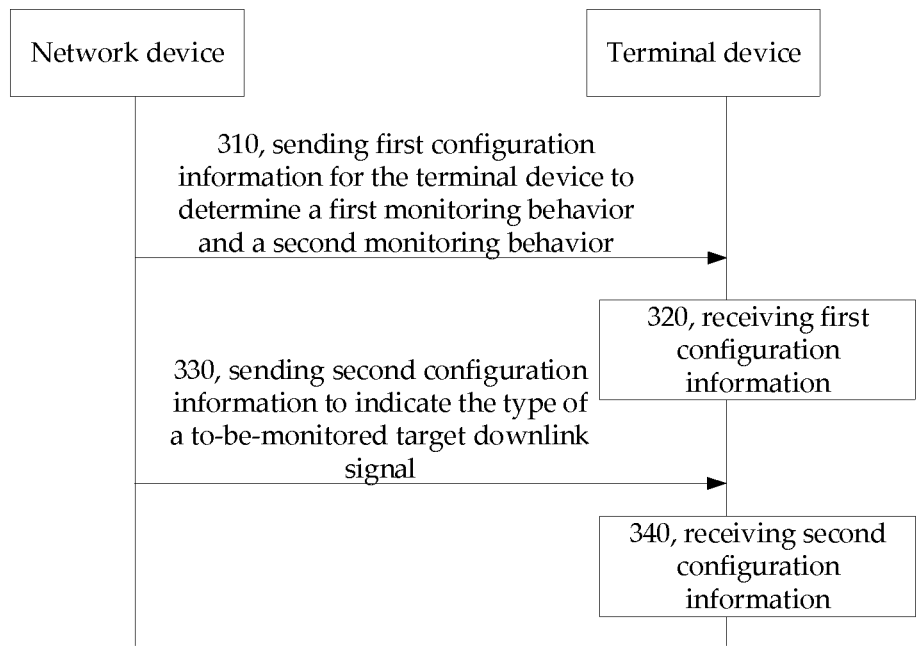
FIG. 9 is a schematic flowchart of a wireless communication method for unlicensed spectrum according to an embodiment of the present application.

For example, in the method 300 shown in FIG. 9, the network device may send first configuration information to the terminal device, and the first configuration information may be used by the terminal device to determine the first monitoring mode and the second monitoring mode.

Optionally, in an embodiment of the present application, the first configuration information includes configuration information of the to-be-monitored PDCCH sets.

In an embodiment of the present application, the network device may also send second configuration information to the terminal device, and the second configuration information may indicate the type of the target downlink signal. The first configuration information and the second configuration information may be carried in the same signaling, or may be carried in different signaling.

It should be understood that the network device does not send the first configuration information and the second configuration information in any specific order. The network device may send the first configuration information first, or may send the second configuration information first, and may also send the first configuration information and the second configuration information at the same time, and the present application does not put limits on this.

Figure 10:
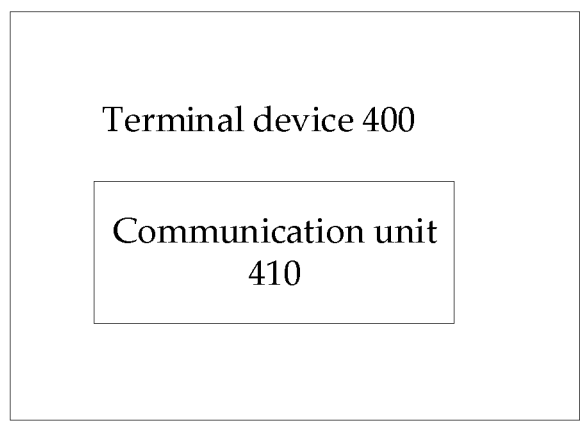
FIG. 10 is a schematic block diagram illustrating a terminal device according to an embodiment of the present application.

FIG. 10 is a schematic block diagram illustrating a terminal device 400 for unlicensed spectrum according to an embodiment of the present application. As shown in FIG. 10, the terminal device 400 includes a communication unit 410 configured for:

monitoring a target downlink signal;

monitoring, when the target downlink signal is detected at a first time-point, physical downlink control channel (PDCCH) from a second time-point, wherein the second time-point is later than the first time-point.

Optionally, in an embodiment of the present application, the target downlink signal includes PDCCH dedicated to the terminal device, common PDCCH or a reference signal.

Optionally, in an embodiment of the present application, the type of the target downlink signal detected at the first time-point is configured by a network device for the terminal device by means of high-layer signaling.

Optionally, in an embodiment of the present application, the communication unit 410 is further connected for:

not monitoring the PDCCH between the first time-point and the second time-point.

Optionally, in an embodiment of the present application, the communication unit 410 is further connected for:

not monitoring the PDCCH between the first time-point and the second time-point when the following conditions are satisfied:

the end of physical downlink shared channel (PDSCH) scheduled by the PDCCH is the boundary of a time slot; and/or the time duration of PDSCH scheduled by the PDCCH is greater than predetermined time duration; and/or the end of PDSCH scheduled by the PDCCH is the second time-point; and/or a to-be-monitored PDCCH set is included between the first time-point and the end of PDSCH scheduled by the PDCCH dedicated to the terminal device.

Optionally, in an embodiment of the present application, the communication unit 410 is further connected for:

monitoring the PDCCH between the first time-point and the second time-point.

Optionally, in an embodiment of the present application, the communication unit 410 is further connected for:

monitoring the PDCCH between the first time-point and the second time-point when the following conditions are satisfied:

the target downlink signal is a reference signal; or the target downlink signal is common PDCCH; or the target downlink signal is PDCCH dedicated to the terminal device, and the end of PDSCH scheduled by the PDCCH dedicated to the terminal device is not the boundary of a time slot and/or the time duration of the scheduled PDSCH is less than or equal to predetermined time duration.

Optionally, in an embodiment of the present application, the way the communication unit 410 monitors the PDCCH between the first time-point and the second time-point is a first monitoring mode, the way the communication unit 410 monitors the PDCCH from the second time-point is a second monitoring mode, and the first monitoring mode is different from the second monitoring mode.

Optionally, in an embodiment of the present application, the target downlink signal is PDCCH, the way the communication unit monitors the target downlink signal is a first monitoring mode, the way the communication unit monitors the PDCCH from the second time-point is a second monitoring mode, and the first monitoring mode is different from the second monitoring mode.

Optionally, in an embodiment of the present application, the first monitoring mode and the second monitoring mode are different in at least one of the following aspects:

the period of PDCCH monitoring, the number of to-be-monitored PDCCH sets included in a single time unit, the number of PDCCH candidates included in the to-be-monitored PDCCH set, the position of resources of PDCCH candidates included in the to-be-monitored PDCCH set, the number of control channel units (CCEs) included in the to-be-monitored PDCCH set, the position of resources of CCEs included in the to-be-monitored PDCCH set, the number of PDCCH candidates included in a single time unit, the position of resources of PDCCH candidates included in a single time unit, the number of CCE resources included in a single time unit and the position of resources of CCEs included in a single time unit.

Optionally, in an embodiment of the present application, the PDCCH candidates included in a single time unit in the second monitoring mode is a subset of the PDCCH candidates included in a single time unit in the first monitoring mode.

Optionally, in an embodiment of the present application, the CCEs included in a single time unit in the second monitoring mode is a subset of the CCEs included in a single time unit in the first monitoring mode.

Optionally, in an embodiment of the present application, the to-be-monitored PDCCH sets included in a single time unit in the second monitoring mode is at least part of the to-be-monitored PDCCH sets included in a single time unit in the first monitoring mode.

Optionally, in an embodiment of the present application, the at least a part of the to-be-monitored PDCCH sets is the to-be-monitored PDCCH set, among the to-be-monitored PDCCH sets included in a single time unit in the first monitoring mode, including the largest number of PDCCH candidates.

Optionally, in an embodiment of the present application, the at least a part of the to-be-monitored PDCCH sets is the to-be-monitored PDCCH set, among the to-be-monitored PDCCH sets included in a single time unit in the first monitoring mode, including the largest number of CCEs.

Optionally, in an embodiment of the present application, in the first monitoring mode, the to-be-monitored PDCCH sets included in a single time unit include a first group of PDCCH candidate sets and a second group of PDCCH candidate sets; in the second monitoring mode, the to-be-monitored PDCCH sets included in a single time unit include the first group of PDCCH candidate sets.

Optionally, in an embodiment of the present application, the number of PDCCH candidates in a single time unit in the first monitoring mode is equal to or greater than the number of PDCCH candidates in a single time unit in the second monitoring mode.

Optionally, in an embodiment of the present application, the number of CCEs in a single time unit in the first monitoring mode is equal to or greater than the number of CCEs in a single time unit in the second monitoring mode.

Optionally, in an embodiment of the present application, in the first monitoring mode, a single time unit includes a plurality of to-be-monitored PDCCH sets, and the number of PDCCH candidates included in each of the to-be-monitored PDCCH sets is the same.

Optionally, in an embodiment of the present application, in the first monitoring mode, a single time unit includes a plurality of to-be-monitored PDCCH sets, and the number of CCEs included in each of the to-be-monitored PDCCH sets is the same.

Optionally, in an embodiment of the present application, in the first monitoring mode, a single time unit includes a plurality of to-be-monitored PDCCH sets, and at least two to-be-monitored PDCCH sets in the plurality of to-be-monitored PDCCH sets include different numbers of PDCCH candidates.

Optionally, in an embodiment of the present application, in the first monitoring mode, a single time unit includes a plurality of to-be-monitored PDCCH sets, and at least two to-be-monitored PDCCH sets in the plurality of to-be-monitored PDCCH sets include different numbers of CCEs.

Optionally, in an embodiment of the present application, in the second monitoring mode, a single time unit includes a plurality of to-be-monitored PDCCH sets, and the number of PDCCH candidates included in each of the to-be-monitored PDCCH sets is the same.

Optionally, in an embodiment of the present application, in the second monitoring mode, a single time unit includes a plurality of to-be-monitored PDCCH sets, and the number of CCEs included in each of the to-be-monitored PDCCH sets is the same.

Optionally, in an embodiment of the present application, a single to-be-monitored PDCCH set includes at least one group of search space sets; or
  a single to-be-monitored PDCCH set corresponds to at least one control resource set with the same time-domain location; or
  a group of search space sets in a single time unit is divided into at least one to-be-monitored PDCCH set.

Optionally, in an embodiment of the present application, the time duration between the first time-point and the second time-point is preset, or configured by a network device, or determined based on PDCCH.

Optionally, in an embodiment of the present application, the time duration between the first time-point and the second time-point is less than or equal to one time slot, or less than or equal to two time slots.

It should be understood that the terminal device 400 may be used to implement corresponding operations implemented by the terminal device in the foregoing method embodiments, and for brevity, details are not described herein again.

Figure 11:
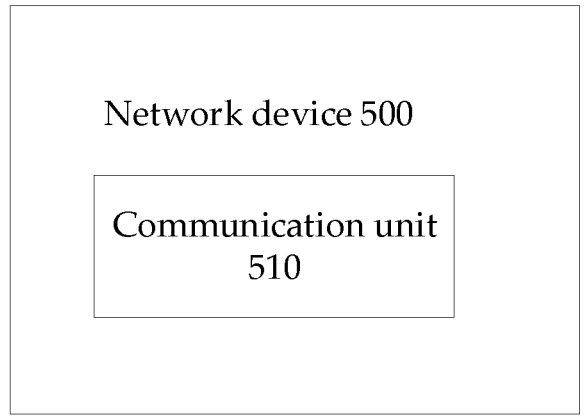
FIG. 11 is a schematic block diagram illustrating a network device according to an embodiment of the present application.

FIG. 11 is a schematic block diagram illustrating a network device 500 for unlicensed spectrum according to an embodiment of the present application. The network device 500 includes a communication unit 510 configured for:
  sending first configuration information to a terminal device, the first configuration information configured for the terminal device to determine a first monitoring behavior and a second monitoring behavior, wherein the first monitoring behavior is different from the second monitoring behavior; the second monitoring behavior is a behavior of monitoring, when a target downlink signal is detected at a first time-point, PDCCH from a second time-point; the first monitoring behavior is a behavior of monitoring PDCCH between the first time-point and the second time-point, or the first monitoring behavior is a behavior of monitoring the target downlink signal before the first time-point in a situation that the target downlink signal is PDCCH.

Optionally, in an embodiment of the present application, the communication unit 510 is further connected for:
  sending second configuration information to the terminal device, the second configuration information configured to indicate the type of the target downlink signal monitored by the terminal device before the first time-point.

Optionally, in an embodiment of the present application, the target downlink signal includes PDCCH dedicated to the terminal device, common PDCCH or a reference signal.

Optionally, in an embodiment of the present application, the first monitoring mode and the second monitoring mode are different in at least one of the following aspects:
  the period of PDCCH monitoring, the number of to-be-monitored PDCCH sets included in a single time unit, the number of PDCCH candidates included in the to-be-monitored PDCCH set, the position of resources of PDCCH candidates included in the to-be-monitored PDCCH set, the number of CCEs included in the to-be-monitored PDCCH set, the position of resources of CCEs included in the to-be-monitored PDCCH set, the number of PDCCH candidates included in a single time unit, the position of resources of PDCCH candidates included in a single time unit, the number of CCE resources included in a single time unit and the position of resources of CCEs included in a single time unit.

Optionally, in an embodiment of the present application, the PDCCH candidates included in a single time unit in the second monitoring mode is a subset of the PDCCH candidates included in a single time unit in the first monitoring mode.

Optionally, in an embodiment of the present application, the CCEs included in a single time unit in the second monitoring mode is a subset of the CCEs included in a single time unit in the first monitoring mode.

Optionally, in an embodiment of the present application, the to-be-monitored PDCCH sets included in a single time unit in the second monitoring mode is at least part of the to-be-monitored PDCCH sets included in a single time unit in the first monitoring mode.

Optionally, in an embodiment of the present application, the at least a part of the to-be-monitored PDCCH sets is the to-be-monitored PDCCH set, among the to-be-monitored PDCCH sets included in a single time unit in the first monitoring mode, including the largest number of PDCCH candidates.

Optionally, in an embodiment of the present application, the at least a part of the to-be-monitored PDCCH sets is the to-be-monitored PDCCH set, among the to-be-monitored PDCCH sets included in a single time unit in the first monitoring mode, including the largest number of CCEs.

Optionally, in an embodiment of the present application, in the first monitoring mode, the to-be-monitored PDCCH sets included in a single time unit include a first group of PDCCH candidate sets and a second group of PDCCH candidate sets; in the second monitoring mode, the to-be-monitored PDCCH sets included in a single time unit are the first group of PDCCH candidate sets.

Optionally, in an embodiment of the present application, the number of PDCCH candidates in a single time unit in the first monitoring mode is equal to or greater than the number of PDCCH candidates in a single time unit in the second monitoring mode.

Optionally, in an embodiment of the present application, the number of CCEs in a single time unit in the first monitoring mode is equal to or greater than the number of CCEs in a single time unit in the second monitoring mode.

Optionally, in an embodiment of the present application, in the first monitoring mode, a single time unit includes a plurality of to-be-monitored PDCCH sets, and the number of PDCCH candidates included in each of the to-be-monitored PDCCH sets is the same.

Optionally, in an embodiment of the present application, in the first monitoring mode, a single time unit includes a plurality of to-be-monitored PDCCH sets, and the number of CCEs included in each of the to-be-monitored PDCCH sets is the same.

Optionally, in an embodiment of the present application, in the first monitoring mode, a single time unit includes a plurality of to-be-monitored PDCCH sets, and at least two to-be-monitored PDCCH sets in the plurality of to-be-monitored PDCCH sets include different numbers of PDCCH candidates.

Optionally, in an embodiment of the present application, in the first monitoring mode, a single time unit includes a plurality of to-be-monitored PDCCH sets, and at least two to-be-monitored PDCCH sets in the plurality of to-be-monitored PDCCH sets include different numbers of CCEs.

Optionally, in an embodiment of the present application, in the second monitoring mode, a single time unit includes a plurality of to-be-monitored PDCCH sets, and the number of PDCCH candidates included in each of the to-be-monitored PDCCH sets is the same.

Optionally, in an embodiment of the present application, in the second monitoring mode, a single time unit includes a plurality of to-be-monitored PDCCH sets, and the number of CCEs included in each of the to-be-monitored PDCCH sets is the same.

Optionally, in an embodiment of the present application, a single to-be-monitored PDCCH set includes at least one group of search space sets; or
   a single to-be-monitored PDCCH set corresponds to at least one control resource set with the same time-domain location; or
   a group of search space sets in a single time unit is divided into at least one to-be-monitored PDCCH set.

It should be understood that the terminal device 500 may be used to implement corresponding operations implemented by the network device in the foregoing method embodiments, and for brevity, details are not described herein again.

Figure 12:
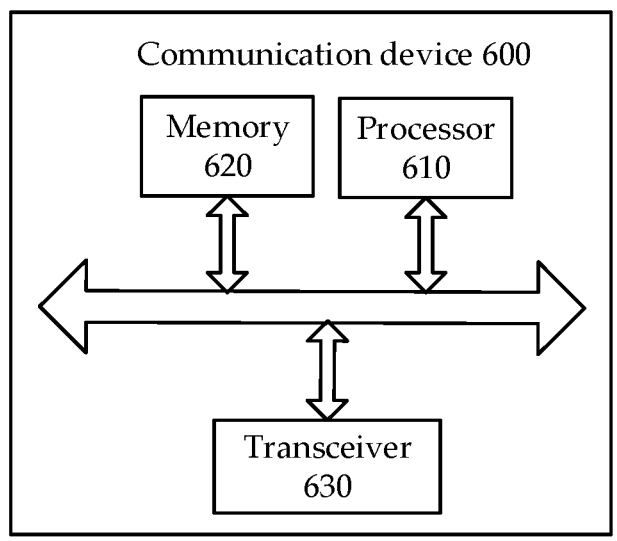
FIG. 12 is a schematic block diagram illustrating a communication device according to an embodiment of the present application.

FIG. 12 is a structural schematic diagram illustrating a communication device 600 provided in an embodiment of the present application. The communication device 600 shown in FIG. 12 includes a processor 610, wherein the processor 610 may call and run a computer program from a memory to implement a method in an embodiment of the present application.

Optionally, as shown in FIG. 12, the communication device 600 may further include a memory 620. The processor 610 may call and run a computer program from the memory 620 to implement a method in an embodiment of the present application.

The memory 620 may be a separate device independent of the processor 610 or may be integrated in the processor 610.

Optionally, as shown in FIG. 12, the communication device 600 may further include a transceiver 630, and the processor 610 may control the transceiver 630 to communicate with another device. Specifically, information or data may be sent to another device, or information or data sent by another device is received.

The transceiver 630 may include a transmitter and a receiver. The transceiver 630 may further include antennas, wherein the number of antennas may be one or more.

Optionally, the communication device 600 may be a network device according to an embodiment of the present application, and the communication device 600 may implement corresponding processes implemented by the network device in various methods of embodiments of the present application, which will not be repeated here for the sake of brevity.

Optionally, the communication device 600 may be a mobile terminal/a terminal device according to an embodiment of the present application, and the communication device 600 may implement corresponding processes implemented by the mobile terminal/the terminal device in various methods of the embodiments of the present application, which will not be repeated here for the sake of brevity.

Figure 13:
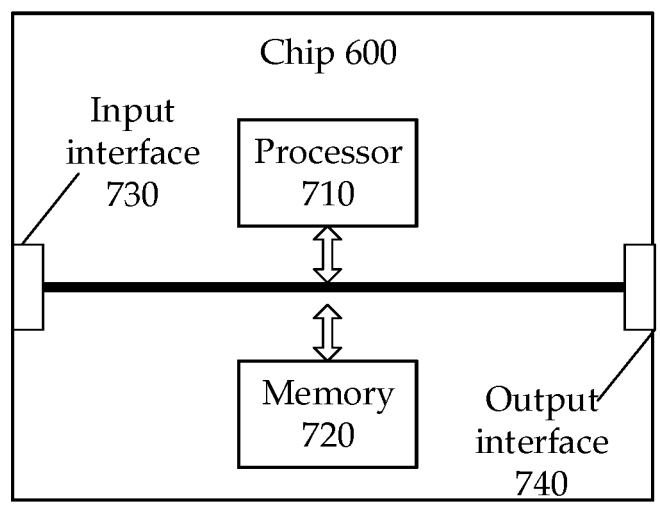
FIG. 13 is a schematic block diagram illustrating a chip according to an embodiment of the present application.

FIG. 13 is a structural schematic diagram illustrating a chip according to an embodiment of the present application. The chip 700 shown in FIG. 13 includes a processor 710, wherein the processor 710 may call and run a computer program from a memory to implement a method in an embodiment of the present application.

Optionally, as shown in FIG. 13, the chip 700 may further include a memory 720. The processor 710 may call and run a computer program from the memory 720 to implement a method in an embodiment of the present application.

The memory 720 may be a separate device independent of the processor 710 or may be integrated in the processor 710.

Optionally, the chip 700 may further include an input interface 730. The processor 710 may control the input interface 730 to communicate with other devices or chips, in particular, to acquire information or data transmitted by other devices or chips.

Optionally, the chip 700 may further include an output interface 740. The processor 710 may control the output interface 740 to communicate with other devices or chips, in particular, to output information or data to other devices or chips.

Optionally, the chip can be applied to the network device in the embodiment of the present application; moreover, the chip may perform corresponding processes implemented by the network device in each of the methods of the embodiment of the present application. For brevity, details will not be described herein again.

Optionally, the chip can be applied to the mobile terminal/the terminal device in the embodiment of the present application; moreover, the chip may perform corresponding processes implemented by the mobile terminal/the terminal device in each of the methods of the embodiment of the present application. For brevity, details will not be described herein again.

It should be understood that the chip mentioned in the embodiments of the present application can be called a system-level chip, a system-on-chip, a chip system.

It is to be understood that the processor of the embodiment of the present application may be an integrated circuit chip with signal processing capabilities. In the implementation process, each step of the foregoing method embodiment may be completed by an integrated logic circuit in the processor or instructions in a form of software. The foregoing processor may be a general-purpose processor, a digital signal processor (DSP), an application specific integrated circuit (ASIC), a field programmable gate array (FPGA), or other programmable logic device, discrete gate, or a transistor logic device, or a discrete hardware component. The methods, steps, and logical block diagrams disclosed in the embodiments of the present application can be implemented or executed. The general-purpose processor may be a microprocessor or the processor may also be any conventional processor, or the like. The steps of the method disclosed in the embodiments of the present application may be directly implemented by the hardware decoding processor, or may be performed by a combination of hardware and software modules in the decoding processor. The software module may be located in a conventional storage medium in the art, such as a random access memory, a flash memory, a read only memory, a programmable read only memory or an electrically erasable programmable memory, and a register. The storage medium is located in the memory, and the processor reads the information in the memory and completes the steps of the above method in combination with its hardware.

It is understood that the memory in the embodiments of the present application may be a volatile memory or a non-volatile memory, or may include both volatile and non-volatile memory. Suitable non-volatile memories may include read only memory (ROM), programmable ROM (PROM), erasable programmable ROM (EPROM), electrically erasable programmable ROM (EEPROM), or flash memory. Volatile memories may include random access memory (RAM), which acts as an external cache. By way of example, but not limitation, many forms of RAM are available, such as a static random access memory (SRAM), a dynamic random access memory (DRAM), a Synchronous DRAM (SDRAM), a Double Data Rate SDRAM (DDR SDRAM), an Enhanced SDRAM (ESDRAM), a Synchlink DRAM (SLDRAM) and a Direct Rambus RAM (DR RAM).

It should be noted that the memory of the systems and methods described herein may include, but not limited to, these and any other suitable types of memory.

It is to be understood that foregoing memory is exemplary but not limited, and for example, the memory in the embodiments of the present application may also be as a static random access memory (SRAM), a dynamic random access memory (DRAM), a Synchronous DRAM (SDRAM), a Double Data Rate SDRAM (DDR SDRAM), an Enhanced SDRAM (ESDRAM), a Synchlink DRAM (SLDRAM) or a Direct Rambus RAM (DR RAM).

That is, the memory in the embodiments of the present application includes, but is not limited to, these and any other suitable types of memory.

The embodiment of the present application further provides a computer readable storage medium for storing a computer program.

Optionally, the computer readable storage medium can be applied to the network device in the embodiment of the present application; moreover, the computer readable storage medium enables a computer to execute corresponding processes implemented by the network device in each of the methods of the embodiment of the present application. For brevity, details will not be described herein again.

Optionally, the computer readable storage medium can be applied to the mobile terminal/the terminal device in the embodiment of the present application; moreover, the computer readable storage medium enables a computer to execute corresponding processes implemented by the mobile terminal/the terminal device in each of the methods of the embodiment of the present application. For brevity, details will not be described herein again.

The embodiment of the present application further provides a computer program product including computer program instructions.

Optionally, the computer program product can be applied to the network device in the embodiment of the present application; moreover, the computer program product enables a computer to execute corresponding processes implemented by the network device in each of the methods of the embodiment of the present application. For brevity, details will not be described herein again.

Optionally, the computer program product can be applied to the mobile terminal/the terminal device in the embodiment of the present application; moreover, the computer program product enables a computer to execute corresponding processes implemented by the mobile terminal/the terminal device in each of the methods of the embodiment of the present application. For brevity, details will not be described herein again.

The embodiment of the present application further provides a computer program.

Optionally, the computer program can be applied to the network device in the embodiment of the present application; moreover, the computer program enables a computer to execute corresponding processes implemented by the network device in each of the methods of the embodiment of the present application. For brevity, details will not be described herein again.

Optionally, the computer program can be applied to the mobile terminal/the terminal device in the embodiment of the present application; moreover, the computer program enables a computer to execute corresponding processes implemented by the mobile terminal/the terminal device in each of the methods of the embodiment of the present application. For brevity, details will not be described herein again.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. Professional technicians can use different methods to implement the described functions for each specific application, but such implementation should not be considered to be beyond the scope of the present application.

It may be clearly understood by a person skilled in the art that, for ease and brevity of description, for a detailed working process of the foregoing system, apparatus, and unit, reference may be made to a corresponding process in the foregoing embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the presented or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts presented as units may or may not be physical units, may be located in one position, or may be distributed on a plurality of network units. Some or all of the units may be selected according to actual requirements to achieve the purposes of the solutions of the embodiments.

In addition, the functional units in various implementations of the present disclosure may be integrated into one processing unit, or each unit may be physically present, or two or more units may be integrated into one unit.

When the functions are implemented in the form of a software functional unit and sold or used as an independent product, the functions may be stored in a computer-readable storage medium. Based on such an understanding, the technical solutions of the present application essentially, or the part contributing to the prior art, or a part of the technical solutions may be implemented in a form of a software product. The computer software product is stored in a storage medium, and includes several instructions for instructing a computer device (which may be a personal computer, a server, or a network device) to perform all or a part of the steps of the method described in each of the embodiments of the application. The foregoing storage medium includes any medium that can store program code, such as a USB flash drive, a removable hard disk, a Read-Only Memory (ROM), a Random Access Memory (RAM), a magnetic disk, or an optical disc.

The above is only the specific implementation of the present application, but the scope of protection of the present application is not limited to this. Any person skilled in the art can easily think of changes or substitutions within the scope of technology disclosed in the application, which shall be covered within the scope of protection of the present application. Therefore, the scope of protection of the present application shall be subjected to the scope of protection in the claims.

What is claimed is:

1. A method for unlicensed spectrum in wireless communication, comprising:
   monitoring, by a terminal device, group common physical downlink control channel (PDCCH);
   monitoring, by the terminal device when the group common PDCCH is detected at a first time-point, PDCCH from a second time-point, wherein the second time-point is later than the first time-point; and
   monitoring, by the terminal device, the PDCCH between the first time-point and the second time-point; wherein the way the terminal device monitors the PDCCH between the first time-point and the second time-point is a first monitoring mode, the way the terminal device monitors the PDCCH from the second time-point is a second monitoring mode, and the first monitoring mode is different from the second monitoring mode;
   wherein the first monitoring mode and the second monitoring mode are different in at least one of following aspects:
   the period of PDCCH monitoring, the number of PDCCH candidates comprised in a to-be-monitored PDCCH set, the position of resources of PDCCH candidates comprised in the to-be-monitored PDCCH set, the number of control channel elements (CCEs) comprised in the to-be-monitored PDCCH set, and the position of resources of CCEs comprised in the to-be-monitored PDCCH set.

2. The method of claim 1, wherein the first monitoring mode and the second monitoring mode are further different in at least one of the following aspects:
   the number of to-be-monitored PDCCH sets comprised in a single time unit, the number of PDCCH candidates comprised in a single time unit, the position of resources of PDCCH candidates comprised in a single time unit, the number of CCE resources comprised in a single time unit and the position of resources of CCEs comprised in a single time unit.

3. The method of claim 1, wherein the PDCCH candidates comprised in a single time unit in the second monitoring mode is a subset of the PDCCH candidates comprised in a single time unit in the first monitoring mode.

4. The method of claim 1, wherein the CCEs comprised in a single time unit in the second monitoring mode is a subset of the CCEs comprised in a single time unit in the first monitoring mode.

5. The method of claim 1, wherein the to-be-monitored PDCCH sets comprised in a single time unit in the second monitoring mode is at least a part of the to-be-monitored PDCCH sets comprised in a single time unit in the first monitoring mode.

* * * * *